United States Patent
Fuller et al.

(10) Patent No.: US 6,882,889 B2
(45) Date of Patent: Apr. 19, 2005

(54) CONSTRAINED DYNAMIC INVERSION CONTROL ALGORITHM

(75) Inventors: James W. Fuller, Amston, CT (US); Indraneel Das, Vernon, CT (US)

(73) Assignee: United Technologies Corporation, Hartford, CT (US)

(*) Notice: Subject to any disclaimer, the term of this patent is extended or adjusted under 35 U.S.C. 154(b) by 177 days.

(21) Appl. No.: 10/308,286

(22) Filed: Dec. 2, 2002

(65) Prior Publication Data

US 2004/0107013 A1 Jun. 3, 2004

(51) Int. Cl.[7] .............................................. G05B 13/02
(52) U.S. Cl. ..................... 700/44; 700/34; 700/30; 700/31; 700/45; 700/52; 700/53; 700/73; 702/185; 702/186; 703/2; 717/113; 717/121; 717/151
(58) Field of Search ........................... 700/34, 44–45, 700/52–53, 73–74, 28–29, 30, 31; 702/185, 186; 717/121, 113, 151; 703/2

(56) References Cited

U.S. PATENT DOCUMENTS

| | | | | |
|---|---|---|---|---|
| 4,602,324 A | * | 7/1986 | Fujawa et al. ................. 700/1 |
| 5,628,199 A | * | 5/1997 | Hoglund et al. ............... 62/155 |
| 5,642,722 A | | 7/1997 | Schumacher et al. | |
| 5,819,714 A | | 10/1998 | Bush et al. | |
| 6,029,099 A | * | 2/2000 | Brown ....................... 700/245 |
| 6,330,483 B1 | | 12/2001 | Dailey | |
| 6,594,620 B1 | * | 7/2003 | Qin et al. .................... 702/185 |
| 2004/0107012 A1 | * | 6/2004 | Das et al. ...................... 700/53 |

* cited by examiner

*Primary Examiner*—Ramesh Patel
(74) *Attorney, Agent, or Firm*—Carlson, Gaskey & Olds, PC

(57) ABSTRACT

A method of controlling a multivariable system includes the step of receiving a plurality of sensor signals indicating current conditions of the system and receiving a plurality of commands. The desired dynamic response of the system is then determined based upon the commands and the sensor signals. The problem of controlling the system to achieve the desired dynamic response without violating numerous actuator and physical constraints is then formulated as a quadratic programming problem. By solving the quadratic programming problem, the effector commands are determined and the physical constraints are enforced.

27 Claims, 1 Drawing Sheet

CONSTRAINED DYNAMIC INVERSION CONTROL ALGORITHM

This invention was conceived in performance of work under U.S. Government Contract N00421-01-2-0131.

BACKGROUND OF THE INVENTION

The present invention relates generally to control systems and more particularly to dynamic inversion control systems.

Dynamic inversion is a method for the design and implementation of control software for realtime, onboard control system computers. A version has been developed by aerospace companies for flight control software for fighter aircraft. Controlling an aircraft's trajectory through the air requires means or effectors (such as the elevator) that can change the aircrafts pitch, yaw, roll, and speed. The main focus of the current versions of dynamic inversion has been control logic for commanding a surplus of means for producing the various forces and moments required. The term surplus implies there are several combinations of effectors, such as thrust vectoring, elevators and canards, that cause the aircraft to pitch, or to yaw, etc. in controllable amounts. Dynamic inversion has been developed to exploit this surplus by 1) increasing the range of total forces and moments beyond the limits of the individual effectors, 2) providing smooth switching to another effector when one reaches its limit, 3) maximizing the potential rate at which forces and moments might be altered, 4) minimizing the impact of a undetected failure in one or more of the effectors, 5) surviving the failure or destruction of some the effectors, 6) varying control laws as the number of free effectors vary with flight mode.

The plant or structure being controlled (e.g. the aircraft and its components) has physical limits that must be observed. For example, the effectors on an aircraft have the power to damage the aircraft's structure (such as tearing off its wings). These physical limits of the plant are not represented in the known dynamic inversion method itself. Thus the known dynamic inversion method may produce outputs that would violate the physical limits of the plant. As a result, these physical limits are enforced via ad hoc logic modifying the inputs to the dynamic inversion method so as to prevent damage to the plant. The ad hoc treatment of the physical limits is not possible where the plant is operating very close to too many physical limits.

SUMMARY OF THE INVENTION

The present invention provides an improved system and method for controlling a multivariable system using dynamic inversion that observes physical constraints. Because the physical constraints are brought into the dynamic inversion process, the present invention is much more efficient at handling and enforcing multiple physical constraints. The present invention also provides a new method and means for prioritizing the response in a multivariable system when the system is at one or more of its physical limits.

The present invention also provides a novel control logic (software) architecture that separates control logic design and implementation into Dynamic Feed-Forward (DFF), Dynamic Model Follower (DMF) and Dynamic Inversion (DI) modules. The DFF module produces a component of a command of how the system output should change by the next controller sample period. Its design establishes the nominal command response dynamics. The word nominal is used here to indicate the ideal situation where the system dynamics behave the same as a mathematical model of the system used in control law design. Non-nominal behavior is thus due to, the inevitable, modeling errors. The DI module determines effector commands that best cause the system outputs to change as desired. DI thus "inverts" the system dynamics by making them appear as simple, uncoupled digital integrators. Even when the system dynamics vary with configuration or operating point, the dynamics with DI appear the same throughout the system's operating envelope and the same from one type of system to another. The DMF module compares desired and actual system responses to adjust the output change command as needed to attenuate the effects of modeling errors and disturbances. DMF establishes how quickly and completely the effects of model errors and disturbances are attenuated.

This separation of design improves performance and software productivity. The inventive design allows the system command response to be faster than the feedback loop is capable of. Feedback loop bandwidth is limited by the need to be stable and well behaved despite model errors. However, the DFF establishes the nominal command response without using feedback from the system, and thus its stability is not affected by model error. The simplifying action of the DI module makes dynamic feedforward algorithms feasible for a wide range of systems.

The inventive design also reduces the scope of logic that must be changed to upgrade or modify the control software to respond to changes in the system design or to respond to changing requirements. To a large extent, if the system dynamics model changes, only the DI module needs modification. If it becomes apparent the model errors (e.g., time delays) are more or less than expected only the DMF module requires changes. To change the desired command response dynamics, only requires modification to the DFF module.

The inventive design also increases software reuse. Because this is a formal design method it applies to a wide class of nonlinear, multivariable systems and because it explicitly includes the notion of limits and constraints, there will be significantly less ad hoc control logic and fewer "modes" of the logic. Also, significant portions of the logic, such as the quadratic program solver are general purpose software and do not change from one application to the next.

The present invention also has application to more general systems. Prior Dynamic Inversion applications required that the effectors directly affect the time derivative, or higher order time derivative, of the system variables that need to be controlled. This is not true of the outputs from certain systems. This invention generalizes dynamic inversion so that it can be applied to any system that can be modeled with a linear parameter-varying differential equation (as well at to any dynamical system for which a state-space model exists).

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
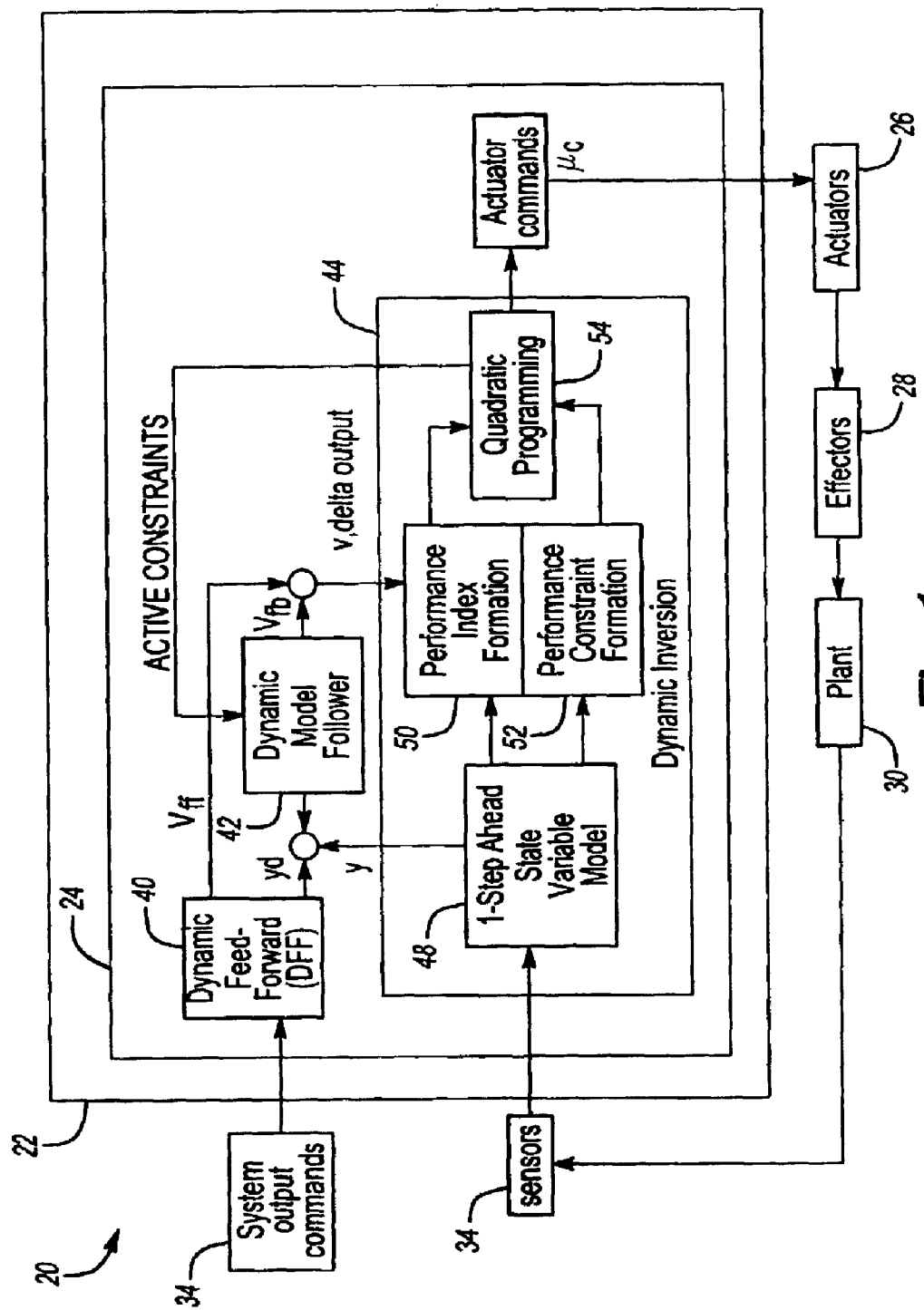
FIG. 1 illustrates the multivariable control system of the present invention.

FIG. 1 illustrates a control system 20 according to the present invention. The constrained dynamic inversion algorithm is meant to be implemented on a discrete time sampled-data computer 22 in order to control a dynamic system. The computer 22 includes a CPU, memory 24 and other known hardware and is programmed to perform as described herein to produce actuator commands, uc. The actuator commands, uc, control a plurality of actuators 26, which take the electronic commands, uc, and turn them into physical forces that adjust a plurality of effectors 28, each of the plurality of actuators 26 being associated with one of the plurality of effectors 28. The effectors 28 change the dynamics of the plant 30. A plurality of sensors 32 provide feedback y to the computer 22. The computer 22 determines the next set of actuator commands, uc, based upon the information from the sensors 32 and based upon system output commands 34, which may come from a human operator or a higher level control system.

The computer 22 periodically samples commands, yc, and sensor feedback, y, in order to make actuator commands, uc. y(n) and yc(n) refer to values of y and yc at the nth sampling, which occurs at time n. The actuators 26 interpret uc(n) as a constant command held from time n to time n+1. y, yc, and u can all be vectors to represent multiple degrees of freedom. As used herein, the current time is time n and the time of the next controller sample is time n+1. The control algorithm is implemented via controller software. It determines the actuator commands, u, that make the system outputs, y, nominally approach the commanded values yc, with the desired dynamics, specified by signal yd. The commands may come from a human operator or a higher level control system. This is a well known form of a digital computer based control system. The substance of this invention is a novel control algorithm stored in memory 24 and executed by computer 22.

The control logic (software) architecture separates control logic design and implementation into Dynamic Feed-Forward (DFF) 40, Dynamic Model Follower (DMF) 42 and Dynamic Inversion (DI) 44 modules. The DFF 40 module produces a component of a command of how the system output should change by the next controller sample period, vff. Its design establishes the nominal command response dynamics. DFF 40 also produces the desired response signal, yd, which specifies what the system output, y, should be at any given computer sample time, if y where approaching yc with the desired dynamic trajectory. The DI 44 module determines effector 28 commands that best cause the system outputs to change as desired during the next sample period. DI 44 thus "inverts" the system dynamics by making them appear as simple, uncoupled digital integrators. DI can be used to invert the dynamics into other forms, but the choice of uncoupled integrators makes it particularly easy to design and implement the dynamic feedforward signal, vff. Even when the system dynamics vary with configuration or operating point, the dynamics with DI 44 appear the same throughout the system's operating envelope and the same from one type of system to another. The DMF 42 module compares desired and actual system responses to adjust the output change command as needed to attenuate the effects of modeling errors and disturbances. DMF 42 establishes how quickly and completely the effects of model errors and disturbances are attenuated.

The DI 44 module can be further subdivided into four modules as shown in FIG. 1, for a total six modules as follows:

A state variable model 48 produces a linearized model for predicting values of system variables, y(n+1), one control sample ahead (a.k.a. the next step) as a function of the actuator commands, uc(n). This prediction also uses a feedback measure of the current output, y(n) and the command signals for any effectors not actively under control of the Constrained Dynamic Inversion (e.g., failed actuators).

A performance index block 50 uses this model to formulate the determination of actuator commands, uc(n), as a quadratic optimization problem with linear constraints. One input to this block is the command v(n) which is the amount the system output y should change by the time n+1. The performance index contains a quadratic (aka, weighted sum of squared error) measure of how well this will be achieved, as predicted by the model.

A robust constraint block 52 transforms limits and constraints on the effectors and on various variables of system response into the form of linear inequality equations with uc(n) as the independent variables. These constraints are formulated in a novel way so as to make them robust to model errors.

A quadratic programming block 54 solves the special type of optimization problem posed by the performance index and constraint equations. If there are just the right amount of effectors and the system is not on any limits or constraints, then the QP solver merely performs the computations to determine the unique actuator commands required to make y(n+1)=y(n)+v(n). Other cases are more complicated, as discussed below.

The dynamic feedforward (DFF) block 40 explicitly contains the specification of how the controlled system should dynamically respond to commands in the form of a Desired Response Model. This model outputs yd(n), the value of y(n), if the system were behaving as desired. DFF 40 also produces a component, vff, of v(n) that will nominally cause the system output y(n) to equal the desired command response, yd(n), at all times. This establishes the nominal command response dynamics.

The DMF 42 block is a feedback controller that compares desired and actual responses to determine a feedback component, vfb, of the v command. This component compensates for the differences between the onboard model and the real system. It establishes how quickly and completely the effects of model errors and disturbances are attenuated. The dynamics of the system combined with the four Dynamic Inversion blocks is greatly simplified. This combination nominally has uncoupled responses to the v commands, relatively simple dynamics, and is invariant over the operating envelope. The DMF and DFF blocks set v to determine the dynamic response of the controlled system to external commands and to feedback signals in a manner that exploits this simplicity.

State Variable Model

The state variable model block 48 produces the coefficient matrices (A,B,C,D) and the base point (xb, ub, yb), for a locally linearized model of the system. The overall linearized model is in the form of a linear parameter varying model. That implies the coefficients vary with one or more parameters.

This invention applies to systems whose dynamics can be modeled with the nonlinear dynamic equations:

$$\frac{dx}{dt} = f(x, u, w) \text{ and } y = h(x, u, w)$$

where x is the termed state vector of the system, u is the commanded actuator outputs, and w are uncommanded inputs, termed disturbances. The vector y contains system outputs the controller needs to affect and also outputs that have significant constraints or limits.

For use with dynamic inversion, these equations are solved for one controller period ahead of the current time and linearized about xb and ub as follows.

$$\Delta x(n) = \int f(x,u) \cdot dt \approx f(xb,ub) * \Delta T + A(x(n)-xb) + B(u(n)-ub)$$

$$y(n) = h(xb,ub) + C(x(n)-xb) + D(u(n)-ub)$$

where xb and ub may vary with some parameter and are chosen so f(xb,ub)=0. w is a modeling error and is neglected within DI 44 but attenuated by DMF 42. Subtracting the y equation at time n from that at time n+1 yields $$\Delta y(n) = y(n+1) - y(n) = C\Delta x(n) + D\Delta u(n)$$

where $\Delta x(n) = x(n+1) - x(n)$ and $\Delta u(n) = u(n+1) - u(n)$

The invention also applies when this model is only approximately accurate.

The matrix B and the vectors u and ub can be separated into two parts associated with actuators commanded by Constrained Dynamic Inversion and other actuators. The terms associated with the other actuators will be due to an outside input to this model. The separation can be changed during operation. This allows to operate in a coordinated fashion with other control loops, to respond to situations where some actuators are not used in all operating conditions, and to failed actuators. Matrices C and D and vectors $\Delta x$ and ub are the outputs of the state variable model block. The prediction $\Delta x$ can be produced using a Kalman filter, following well-known methods. If x is directly measured, the $\Delta x$ equation above can also be used. C and D are partitioned into Cy and Cc and Dy and Dc, respectively. Cy and Dy correspond to outputs that DI 44 must control. Cc and Dc correspond to outputs that have limits that will be enforced. Cy, Dy, $\Delta x$ and ub are passed to the performance index formulation block. Cc, Dc, $\Delta x$ and ub are passed to the robust constraint formulation block.

Because DI 44 only uses this model to predict the change one control period ahead and because DMF 42 includes compensating feedback loops, the model accuracy requirement is relatively mild. This implies simplifying model approximations can be used, even though they introduce addition modeling error.

Robust Constraint Formulation

In the constraint block 52, constraints of the form $$z(k) \mathrel{<}= Z\max;$$

can be enforced via DI 44 for all sample times k, where z are outputs of the system. At the nth sample time, DI 44 is determining uc(n), which will effect z(n+1). Therefore, the constraint for the nth sample is $$z(n+1) = z(n) + \Delta z(n) \mathrel{<}= Z\max$$

From the state variable model $$\Delta z(n) = Cc^*\Delta x(n) + Dc^*\Delta udi$$

where udi is the actuator position, possibly predicted by the onboard actuator dynamics model. $\Delta udi$ is its predicted change in the next computer sample period. Here $\Delta udi$ is predicted using the following actuator model $$\Delta udi = Ba^*(uc(n) - udi(n))$$

Substituting this into the above results in $$\Delta z(n) = Cc^*\Delta x(n) + Dc^*Ba^*(uc(n) - udi(n)).$$

Substituting this into the inequality constraint equation results in $$Dc^*Ba^*uc(n) \mathrel{<}= Z\max - z(n) - Cc^*\Delta x(n) + Dc^*Ba^*udi(n).$$

Our experience has shown that this direct form of expressing the constraints is often not robust enough to modeling error. For example, the response z might continually "bounce" off the limit Zmax. Therefore, it is modified as follows $$Dc^*Ba^*uc(n) \mathrel{<}= K^*(Z\max - z(n)) - Cc^*\Delta x(n) + Dc^*Ba^*udi(n), \quad (1)$$

where $0 < K <= 1$. The constraint is said to be active when the equality holds. When a constraint is active, Quadratic Programming (QP) 54 will devote one degree of freedom of uc(n) to making sure that $$\Delta z_{model}(n) = K(Z\max - z(n))$$

where $\Delta z_{model}$ is the change in z predicted by the model. Suppose due to model errors the actual response is $$\Delta z(n) = (1+f)K(Z\max - z(n)) + \text{bias}$$

where f and bias represent model errors. This is a dynamic equation and it must be stable for good controller operation. It will be stable for $$-1 < f < (2-K)/K.$$

K=1 is the direct form. K<1 increases the stability margins. When K<1, z will be limited to less than Zmax for a brief transitory period. If the system remains on this robust constraint, z will asymptotically approach the limit Zmax. Also, the effect of the bias increases as K is reduced. When on the constraint z will settle to the steady state value $$z_{ss} = Z\max + \frac{\text{bias}}{(1+f)K}$$

The choice of K is thus a tradeoff of stability robustness and sensitivity to bias in the onboard model.

The constraint equations will be combination of various types of constraints.

Actuator Limits

Actuator limits take the form: $u(n+1) \leq U\max$ and $u(n+1) \geq U\min$. Following the robust method above, the constraint will be formulated as $$\Delta u(n) \leq K(U\max - u(n)).$$

If the actuator dynamics are modeled as first order lags with a steady state gain of one, the change in actuator position during the next control period will be $$\Delta u(n) = Ba(uc(n) - u(n)).$$

where Ba includes the time constants of the actuators. Substituting the actuator model into the constraint equation yields:

$$Ba^*uc(n) \leq K_1(U\max - u(n)) + Ba^*u(n)$$

Because the actuator models are usually fairly accurate, this can be simplified by choosing constraint dynamics to match the actuator dynamics, that is K=Ba, to yield the final result $$\begin{bmatrix} uc(n) \\ -uc(n) \end{bmatrix} \leq \begin{bmatrix} U\max \\ -U\min \end{bmatrix} \quad (2)$$

By limiting the commands, the actuator position will asymptotically approach the limits, with the time constants of the actuator dynamics.

Type 1 Output Constraints

Constraints on plant response are termed output constraints. The z of the general constraint equation is replaced with system output y where $$yc(n) = yb(n) + Cc(x(n) - xb(n)) + Dc(u(n) - ub(n))$$

and $$\Delta yc(n) = Cc\Delta x(n) + Dc\Delta u(n) = Cc\Delta x(n) + Dc \cdot Ba(uc(n) - u(n))$$

xb, ub, and yb are "base" values about which the nonlinear dynamics are linearized about. Each output constraint is associated with a particular row vector of the Cc and Dc matrices. An output constraint is termed a Type 1 constraint if its associated row of Dc contains some nonzero entries. Substituting this equation for $\Delta yc$ into the general constraint Eq. (1) yields $$Dc \cdot Ba \cdot uc \leq K_2(Y \max - yc(n)) - Cc\Delta \hat{x} + Dc \cdot Ba \cdot \hat{u}(n). \quad (3)$$

Type 2 Output Constraints

If all the entries of the row vector of Dc associated with a constraint are zero, then Eq. (3) does not provide any information as to how the output constraint constrains the choice of uc. Therefore a constraint equation of the form of Eq. (3) cannot be used for QP. The solution is take a derivative (or small perturbation) of the output equation as follows:

The perturbed output equation: $\Delta yc(n) = Cc\Delta x(n)$ is perturbed once more to become: $\Delta(\Delta yc(n)) = Cc \cdot A\Delta x(n) + Cc \cdot B \cdot Ba(uc(n) - u(n))$ where the state dynamics model: $\Delta x(n) = A(x(n) - xb(n)) + B(u(n) - ub(n))$ has been used, which implies: $\Delta(\Delta x(n)) = A\Delta x(n) + B\Delta u(n)$ For a particular constraint, if entries of the associated row of Dc are zero, but those of Cc*B are not all zero, the output constraint is termed a type 2 constraint (If all entries of the row of Cc*B are zero, then a higher order perturbation will be needed). In a Type 2 constraint, z of Eq. (1) is replaced with $\Delta yc$ and a new term is added to get $$\Delta(\Delta yc(n)) \leq K_3(Y \max - yc(n)) - K_4 \Delta yc(n)$$

When one of these constraints is active, this becomes a dynamic equation in yc, and its eigenvalues are determined by $K_3$ and $K_4$. Substituting the plant model for $\Delta \Delta y$ into the above yields the type 2 output constraint $$Cc \cdot B \cdot uc(n) \leq K_3(Y \max - y(n)) - K_4 \Delta y(n) - Cc \cdot A \cdot \Delta x(n) + Cc \cdot B \cdot u(n) \quad (4)$$

This approach can be extended to higher types if needed. Equations (2), (3), and (4) together are the constraint equations for Dynamic Inversion. They are put in the form $$Jcon*uc(n) <= Kcon.$$

and Jcon and Kcon are passed to the QP block.

Performance Index Formulation

The performance index block receives the signal, v(n), whose elements are goals for $\Delta y(n)$. It also receives state variable model terms that form the prediction equation $$\Delta y(n) = Cy\Delta x(n) + Dy*Ba*(uc(n) - udi(n)).$$

The QP solver will find a uc(n) to minimize the following index at time n $$\tfrac{1}{2}(v - \Delta y)^T * Q * (v - \Delta y) + \tfrac{1}{2}(uc - ub)^T * R * (uc - ub)$$

The design of entries in matrices Q and R is based on the properties of the QP solution. Matrix R is chosen so the second term of the index is much smaller than the first, when $(v-\Delta y)$ and $(uc-ub)$ have what the designer regards as equivalent sizes. Note the signal $v-\Delta y$ can be form a number of different ways using the model. If R is small enough, the number of actuators degrees of freedom matches the number of commands, v, and no limits have been reached, then this index will have a minimum when $\Delta y(n)$ is approximately equal to v(n). Note that in this nominal situation Q and the relative values in R do not affect the answer. This means they can be selected for other purposes without changing the nominal response.

Q is selected for those cases where there are fewer available actuators than commands or goals. This can occur by design or can occur during operation. At time of design, practical considerations may dictate there be fewer actuators than goals. Even if the design has more actuators than goals at the start of operation, the number of available actuators drops when actuators fail or when some of the limits are met. When a limit is reached, the QP block 54 will dedicate one degree of freedom of the actuators to enforcing the limit. This reduces the number of actuators available to minimize the performance index by one. If another limit is reached, while still on the first limit, the available actuator degrees of freedom drops by one more, and so on. In these cases not all the goals can be met and instead the system output will be a minimum of the weighted sum of squares deviation from the desired outputs. Q is a matrix of the relative weights. Higher priority goals should have a higher weight in Q.

R is selected for those cases where there are more available actuators than commands or goals. This can occur when the required system reliability exceeds that of individual actuators. In this case, extra actuators are included so that one or more actuator failures can be accommodated. One consequence is that a whole subspace of actuator commands all meet the v goals. The R term of the index ensures there will be a unique command. The relative sizes of the elements in R are used to specify how the actuator redundancy is to be utilized. For example, if there are two identical actuators operating in parallel and they had equal weights in R, they would each bear half the load. If the weight on one was then increased, it would bear less than half the load. When the actuators are dissimilar, actuators with smaller ranges are typically given higher weights, to make them more likely to stay off their limits.

The QP performance index is formed from the above index by substituting the $\Delta y$ equation into the index, expanding the result into terms that are quadratic in uc, linear in uc, and constant, and then dropping the constant terms (since they won't effect uc). The QP solver is then finds a uc(n) that minimizes the performance index J, where $$J = \tfrac{1}{2} uc^T * Qa * uc - f^T * uc, \text{ where}$$

$$Qa = Ba^T * Dy^T * Q * Dy * Ba + R \text{ and}$$

$$f = Ba^T * Dy^T * Q * (v - Cy * \Delta x(n) - Dy * Ba * udi(n)) + R * ub$$

Qa and f are passed to the QP block.

Quadratic Programming

The performance index and inequality constraints specify a constrained optimization problem which is then solved by the Quadratic Programming Block 54 to determine the actuator commands, uc. These are the ultimate output of this invention. The control problem setup was intentionally restricted to linear state variable model, linear inequality constraints, and quadratic performance index in order to specify a strictly convex quadratic programming problem, which is a special type of constrained optimization. All constrained optimization algorithms for practical problems involve a search for the optimal. In strictly convex quadratic programming the search has good properties for realtime control. First, it is relatively reliable. A globally optimal solution exists, it is unique, and there are no local optima to trap the search. Also, each iteration of the iterative search procedure for the optimum only involves the solution of a linear matrix equation, for which the numerical properties (amount of computation, accuracy, sensitivity, and wordlength required) can be accurately analyzed with standard theory.

In an alternate version of this invention, the QP block 54 also produces a signal that indicates constraints are on their limits. This is sent to the DMF module.

Any quadratic programming solver, modified for realtime operation, might be used with this invention. A copending application entitled "Real-Time Quadratic Programming for Control of Dynamical Systems," filed on the same date and having the same inventors as this patent application and having Ser. No. 10/308,285 describes a QP solver with particularly good realtime properties and is hereby incorporated by reference in its entirety.

Dynamic Feedforward (DFF) to the system, they nominally transform it into p uncoupled integrators. That is there are p inputs, in the "v" vector, each input affects only one of the variables to be controlled, and the responses are an integral in time of the inputs. The combined DI+system nominally has the response $$y(n+1)=y(n)+v,$$

where v is determined by the DFF 40 and DMF 42 modules.

The DFF module 40 determines the dynamics of the nominal response of the controlled system to commands. The input to DFF 40 is yc, a vector of commanded values for y, the variables under control. The designer then translates various requirements for the response of system to these commands into the form of a difference equation $$\Delta xd(n)=Ad^*xd(n)+Bd^*yc(n) \text{ and}$$

$$yd(n+1)=Cd^*xd(n)+Dd^*yc(n)$$

where yd is a vector of the desired responses of the system. Typically, the matrices Ad, Bd, Cd, and Dd are selected so that each yc only affects one yd. Those skilled in control theory have a variety of methods for specifying dynamic responses and for forming this difference equation.

The output of DFF 40 at time n is yd(n) and the vector vff(n), where $$vff(n)=yd(n+1)-yd(n).$$

This is the feedforward component of the v command.

The design of dynamic feedforward logic is often too difficult to be practical. One of the virtues of this invention is that it makes dynamic feedforward easy.

Dynamic Model Following (DMF)

The Dynamic Model Follower 42 module is standard feedback control logic. It forms an error signal, which is the difference between the desired response, yd, and the measured response y, and performs computations to produce the feedback component, vfb, of the command v. The feedback is designed to reduce the size of the error signal. Errors can come about due to variations between the model and real system. Because of the action of dynamic inversion, the system appears as p uncoupled integrators. Those skilled in control theory can readily design this feedback logic.

Feedback designers often include a signal that is the integration of the model following error. In these cases, the signal "Active constraints" from the QP block 54 can be used to disable one or more of these integrators as limits are reached. This is generally done, when reaching a certain set of limits implies that not all goals can be reached. Disabling an integrator is an effective means for giving that signal a lower priority.

All the weights, partitioning of the actuators, limits, and model terms can change each control iteration. This allows control of a nonlinear system with sequence of locally linearized models, and it provides great flexibility for the controller to accommodate changing goals and priorities, addition and removal of actuators, etc.

The memory 24 stores a computer program which when executed by the computer 22 performs the steps described above. The memory 24 may comprise electronic memory such as RAM; CD, DVD or other optical media; hard drive, floppy disks or other magnetic media; or any known computer-readable medium or combinations thereof.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers for steps in the method claims are for ease of reference by dependent claims, and do not indicate a required sequence, unless otherwise indicated.

What is claimed is:

1. A method for controlling a multivariable system including the steps of:
   a) receiving a plurality of sensor signals indicating current conditions of the system which are periodically sampled;
   b) receiving a plurality of commands;
   c) determining a desired change in output of the system for at least one future controller sample based upon the commands and sensor signals;
   d) formulating the problem of determining actuator commands to achieve the change in output by the at least one future controller sample as a quadratic programming problem that includes physical limits or constraints of the system.

2. The method of claim 1 wherein said step c) further includes the steps of
   i) determining how a nominal system output should change in the at least one future controller sample,
   ii) specifying the physical limits or constraints, and
   iii) determining the actuator commands to achieve the change.

3. The method of claim 1 further including the step of formulating the problem into a part that determines how a nominal system output should change in the at least one future controller sample, a part that determines the physical limits and constraints, and a part that determines the actuator commands to achieve this change.

4. The method of claim 3 wherein the change requested for the at least one future controller sample is specified in terms of the next output value, a rate of change of the output, acceleration of the output, or net generalized forces and moments on the system.

5. The method of claim 3 wherein the part determining the change in system output required in the at least one future controller sample, in order to achieve a desired command response trajectory, is accomplished using feedback control, feedforward control, explicit use of a model of the desired response or neural networks.

6. The method of claim 1 where the physical constraints are directly included.

7. The method of claim 1 where the physical constraints are indirectly included in terms of the fastest approach to the limit allowed.

8. The method of claim 1 further including the step of:
   e) solving the quadratic programming problem to determine effector commands that will cause the desired change in output.

9. The method of claim 8 wherein the desired dynamic response includes a plurality of outputs.

10. The method of claim 9 wherein the multivariable system is cross-coupled, such that each of the effector commands affects each of the outputs.

11. The method of claim 10 further including the step of enforcing effector limits.

12. The method of claim 11 further including the step of enforcing a prioritization of the commands and physical limits, when not all commands can be accomplished.

13. The method of claim 12 wherein the step of enforcing a prioritization further including the step of turning off feedback control integrators associated with lower priority outputs, if all outputs can not be achieved.

14. The method of claim 13 wherein the step of enforcing a prioritization further includes setting higher performance index weights on the desired change of the higher priority outputs.

15. The method of claim 14 further including the step of changing a weighting on each of a plurality of the commands and physical limits.

16. A multivariable control system comprising:
- a plurality of sensors sampling current conditions of the system including a system output in a plurality of sample periods;
- a plurality of effectors for changing dynamics of the system in response to effector commands;
- a dynamic feed forward module determining a desired change in system output for a subsequent one of the plurality of sample periods;
- a dynamic model follower comparing the desired change in system output with the system output to adjust an output change command as needed; and
- a dynamic inversion module determining the effector commands in order to change the system output based upon the determination by the dynamic feed forward and dynamic model follower modules by formulating a quadratic programming problem to include physical limits of the system.

17. The multivariable control system of claim 16 wherein the dynamic inversion module includes a constraint formation module for transforming the physical limits of the system into a form of linear inequality equations with the effector commands as independent variables.

18. The multivariable system of claim 17 where the linear inequality equations express the fastest dynamic trajectory with which the limits can be approached.

19. The multivariable system of claim 16 wherein the dynamic inversion module further includes a performance index formation module formulating the effector commands as a solution of the quadratic programming problem.

20. The multivariable system of claim 19 wherein the dynamic inversion block further includes a quadratic programming block for solving the quadratic optimization problem and linear equality equations.

21. A computer readable medium storing a computer program, which when executed by a computer performs the steps of:
a) receiving a plurality of sensor signals indicating current conditions of the system which are periodically sampled;
b) receiving a plurality of commands;
c) determining a desired change in output of the system for a next controller sample based upon the commands and sensor signals;
d) formulating the problem of determining actuator commands to achieve the change in output by the next controller sample as a quadratic programming problem that includes physical limits or constraints of the system.

22. The computer readable medium of claim 21 which when executed by a computer further performs the steps of solving the quadratic programming problem to determine effector commands.

23. The computer readable medium of claim 22 wherein the desired dynamic response includes a plurality of outputs.

24. The computer readable medium of claim 23 wherein the multivariable system is cross-coupled, such that each of the effector commands affects each of the outputs.

25. The computer readable medium of claim 24 further performing the step of enforcing effector limits.

26. The computer readable medium of claim 25 further performing the step of prioritizing the commands and physical limits.

27. The computer readable medium of claim 26 further performing the step of changing a weighting on each of a plurality of the commands and physical limits.

* * * * *